No. 649,006. Patented May 8, 1900.
C. P. STEINMETZ.
ALTERNATING CURRENT MOTIVE APPARATUS.
(Application filed Aug. 16, 1897.)
(No Model.)
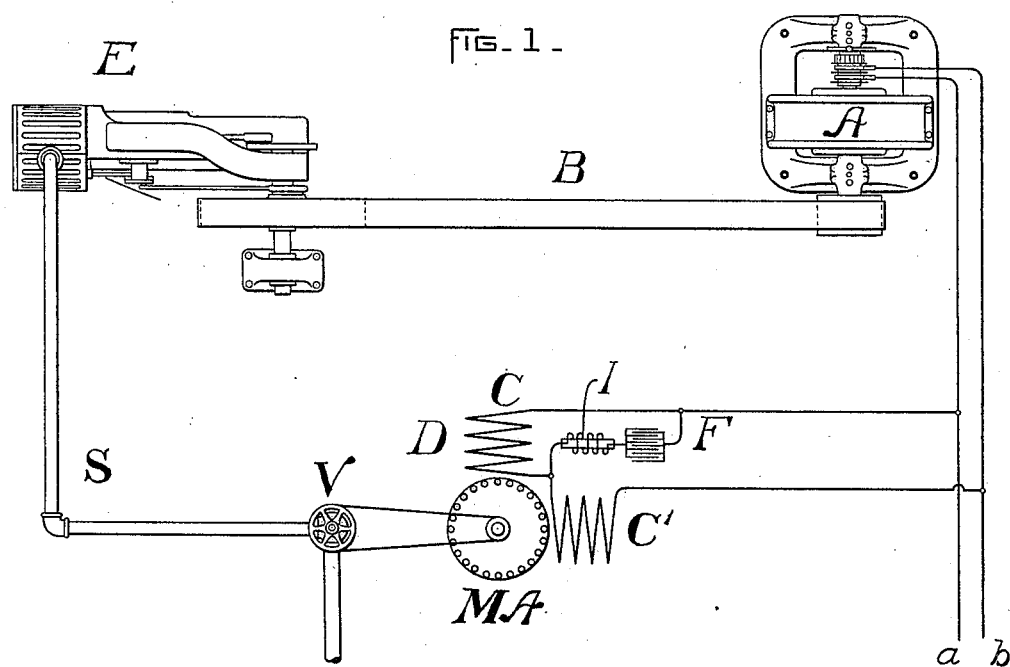
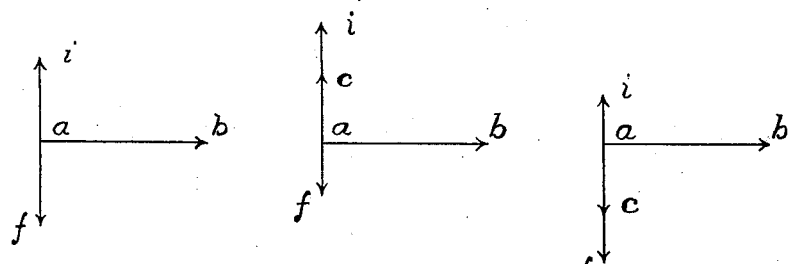
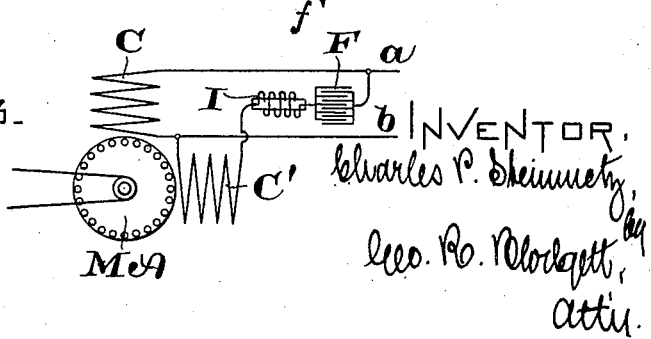
WITNESSES.
A. H. Abell.
A. F. Macdonald.
INVENTOR.
Charles P. Steinmetz,
by Geo. B. Blodgett,
atty.
THE NORRIS PETERS CO., PHOTO-LITHO., WASHINGTON, D. C.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ALTERNATING-CURRENT MOTIVE APPARATUS.

SPECIFICATION forming part of Letters Patent No. 649,006, dated May 8, 1900.

Application filed August 16, 1897. Serial No. 648,363. (No model.)

*To all whom it may concern:*

Be it known that I, CHARLES P. STEINMETZ, a citizen of the United States, residing at Schenectady, in the county of Schenectady, State of New York, have invented certain new and useful Improvements in Alternating-Current Motive Apparatus, (Case No. 602,) of which the following is a specification.

The leading feature of my present invention relates to an alternating-current motive device so constructed and arranged as to afford different characteristic movements when fed with alternating currents of different frequency—for example, an alternating motor which will rotate in one direction when the supply-current exceeds a certain frequency and in the opposite direction when the frequency falls below this value. Such a motive device may be used for a number of purposes and in a wide variety of combinations. Among other things it renders practicable the automatic regulation of alternating-current apparatus for changes in frequency, and suitable combinations for this purpose are herein set forth embodying features of my invention. In fact, automatic regulation of alternating-current apparatus for different frequencies presents especially-useful applications for a motive device of this character, and I have devised the invention with this object particularly in mind, though intending to cover in certain of my claims the motive device by itself, irrespective of its combinations with regulating apparatus. I propose to employ such a motive device for regulating prime movers for alternating-current generators or for regulating generators directly, or in other cases for regulating alternating-current motors or any alternating-current apparatus, or, in fact, for speed regulation of any desired type of apparatus.

In the embodiment of my invention herein particularly described I provide a motor having a winding fed from an alternating-current circuit and acting inductively upon a secondary member to produce rotation. The winding occupies different angular positions around the secondary member, and I employ a phase-modifying device for determining the phase of the current in a portion of the winding and altering this phase relation with changes of frequency in the supply-circuit. Motion in such a motor is due to the presence of a shifting field in the primary member. The direction of the shifting field in my invention is changed by the phase-modifying device upon changes of frequency above and below a certain predetermined value, thereby, of course, correspondingly changing the direction in which the secondary member rotates.

The phase-modifying device herein shown consists of an inductive reactance and capacity reactance connected in series and modifying the phase relation of the currents in different portions of the primary winding. The inductive reactance varies in direct proportion to the frequency and the capacity reactance in inverse proportion to the frequency. At a given frequency the inductance and capacity voltages may be made equal and opposite. Then when the frequency rises the inductive reactance will exceed the capacity reactance, and the total effect will be that of an inductance. On the other hand, at frequencies below the normal the capacity reactance will exceed the inductive reactance, and the total effect will be that of a source of capacity. In this way the direction in which the motor-field shifts becomes dependent upon the frequency in the supply-circuit and we secure in the secondary member of the motor distinctive and characteristic movements changing with the frequency. When this motive device is used for automatic regulation, the armature or secondary member of the motor will be geared to any suitable form of governor, the valve of an engine, the admission-gate of a water-wheel, the rheostat of a motor, &c.

The accompanying drawings show an embodiment of the different features of my invention.

Figure 1 is a diagram showing its application to a steam-engine driving a single-phase alternator. Fig. 2 includes a number of diagrams illustrating the action of the electromotive forces, and Fig. 3 shows an alternative arrangement.

In Fig. 1, A is the alternator, shown as of the single-phase type, E is the engine, and B the belt connecting them. S is the pipe supplying the engine with steam from any suitable source. (Not illustrated.) V is the valve controlling the admission of steam. D is the motor device which I employ, consisting of the short-circuited armature or induced member MA and the coils C C', forming the inducing member of the motor. These coils are connected in series between the lines a b from the single-phase alternator and, as shown, are arranged ninety degrees apart around the secondary member. In the case of a polyphase machine they might be connected between any two of the lines. The coil C is shunted by the inductive reactance I and the capacity reactance F, shown, respectively, as an ordinary inductive coil and a condenser. These two reactances are in series and are connected, as just stated, around the coil C and in series with the coil C'. The motor-armature is geared to the admission-valve V of the engine. The gearing is illustrated as a belt, but any other connection, direct or indirect, may be used.

In Fig. 2 the diagrams show the action of the device. The electromotive force in the coils C C', impressed from the circuit a b, is represented by the line ab. The inductance and capacity are, as already stated, adjusted so that at normal frequency they balance one another and the current in coils C C' is in phase, and the motor remains at rest. This condition is shown in the first diagram, where ai shows the inductance ninety degrees behind the impressed electromotive force ab, and af the equal and opposite capacity reactance ninety degrees ahead of the impressed electromotive force. If now the speed rises, the inductive reactance becomes greater and the capacity reactance smaller, as shown by the different lengths of the lines ai and af in the second diagram. The difference between the inductive reactance and the capacity reactance is indicated by the line ac, which is the resultant of the electromotive forces in the two reactances. This shifts the phase of the current in coil C, so that the current in C leads the current in C' and starts the motor in a clockwise direction. When the speed falls, the opposite action takes place, the capacity reactance becoming greater and the inductive reactance less, and, as shown in the third diagram, where the resultant ac is below the line ab, the phase of the current in coil C is displaced in the opposite direction and the motor starts in the opposite sense. The motor is so connected to the valve that upon rise of speed the steam is throttled and upon falling speed the valve is opened wider, with consequent control of speed.

In Fig. 3 I show an alternative arrangement in which the coils C C' are connected in multiple instead of in series, and the phase-modifying device, consisting of the inductance I and condenser F, is in series with one of the motor-coils C'. The action of this modified construction is as follows: At normal frequency the capacity and inductive reactances balance one another, so that they do not change the phase of the current in coil C'. The currents in coils C C' are therefore in phase and the motor remains at rest. At frequencies above the normal the phase-modifying device acts as an inductance and lags the current in coil C' behind the current in coil C. At frequencies below normal the reverse action takes place. The phase-modifying device acts as capacity and advances the current in coil C' relatively to that in coil C. It will be understood without further explanation that results will be secured similar to those of the arrangement shown in Fig. 1 and already more fully described.

What I claim as new, and desire to secure by Letters Patent of the United States, is—

1. An alternating-current motive device, consisting of a primary member having energizing-coils, a secondary member, and a phase-modifying device for reversing the relative phase relation of the currents in the energizing-coils, in accordance with changes of frequency in the supply-circuit above and below a certain predetermined value.

2. The combination of a shifting-field alternating-current motive device connected to an alternating-current circuit, and a phase-modifying device automatically changing the direction in which the field shifts upon, and in accordance, with changes of frequency in the circuit.

3. The combination with a closed secondary, of an inducing member therefor, and a compound reactance controlling the field produced by said inducing member, the compound reactance being so arranged as to act as a capacity at some frequencies and as an inductance at other frequencies.

4. A motive device provided with two angularly-displaced coils, and with phase-adjusting means for bringing the currents in the two coils into phase with each other at some selected frequency and out of phase with each other at other frequencies.

5. In an induction motive device, the combination with an inducing and an induced member, of means for causing the field of the inducing member to rotate in one direction when the current supplied is above a certain selected frequency, and in the opposite direction when the current supplied is below the selected frequency.

6. The combination, in an alternating-current translating device, of a coil connected to an alternating-current circuit, and a phase-modifying device for shifting the phase of the current in said coil, consisting of an inductive reactance and a capacity reactance connected in series and shunting said coil.

7. The combination, in an alternating-current motive device, of an inducing-winding having impressed upon it an electromotive force of a single phase, and a phase-modifying device for changing the phase relation of the currents in different portions of said winding, consisting of an inductive reactance and a capacity reactance in series and proportioned so as to have the resultant effects of inductance or capacity upon changes of frequency above or below a certain predetermined value.

8. A motive device for alternating currents, comprising an induced member, an inducing member having coils connected to the mains, and a phase-modifying device consisting of an inductive reactance and a capacity reactance in series, said phase-modifying device serving to reverse the relative phase relations of the currents in the energizing-coils upon changes in frequency above and below a certain predetermined value.

9. A motive device for alternating-currents, comprising an induced member mounted for rotation and an inducing member having a winding occupying different angular relations to the secondary member part of which is shunted by an inductive reactance and a capacity reactance in series, the two reactances being so proportioned that at a fixed periodicity the capacity and inductance voltages are substantially equal and opposite, as described.

10. The combination, in a regulating apparatus for prime mover, of a source of alternating current operated by the prime mover, a motive device connected to the source of current, comprising an induced member and an inducing member having a plurality of coils, one of which is shunted by an inductive reactance and a capacity reactance in series, and one of the members connected to a suitable controller regulating the action of the prime mover.

11. In combination, a source of alternating current, and a motive apparatus driving this source of current, a motive device in circuit with the alternator, consisting of an induced member connected to a regulating valve or controller for the prime motive apparatus driving the alternator, and an inducing member consisting of coils connected across the alternating mains, part of the coils being shunted by a condenser and a reactive coil in series; the capacity and inductance being proportioned to cause substantially-equivalent effects at a nornal periodicity, as described and for the purpose set forth.

In witness whereof I have hereunto set my hand this 12th day of August, 1897.

CHARLES P. STEINMETZ.

Witnesses:
B. B. HULL,
A. H. ABELL.